(12) United States Patent
Nakamura et al.

(10) Patent No.: US 12,000,695 B2
(45) Date of Patent: Jun. 4, 2024

(54) ELECTRODE-MISALIGNMENT DETECTION DEVICE IN RESISTANCE WELDER

(71) Applicant: SUBARU CORPORATION, Tokyo (JP)

(72) Inventors: Keiji Nakamura, Tokyo (JP); Teruhiko Yajima, Tokyo (JP); Masahiro Yokoi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 367 days.

(21) Appl. No.: 17/549,590

(22) Filed: Dec. 13, 2021

(65) Prior Publication Data

US 2022/0196399 A1     Jun. 23, 2022

(30) Foreign Application Priority Data

Dec. 23, 2020   (JP) .................................. 2020-214001
Sep. 14, 2021   (JP) .................................. 2021-149572

(51) Int. Cl.
*G01B 21/24*      (2006.01)
*B23K 11/30*      (2006.01)

(52) U.S. Cl.
CPC .......... *G01B 21/24* (2013.01); *B23K 11/3063* (2013.01)

(58) Field of Classification Search
CPC ...... G01B 21/24; G01B 7/31; B23K 11/3063; B23K 11/36; B23K 11/115; B23K 11/11
See application file for complete search history.

(56) References Cited

U.S. PATENT DOCUMENTS 5,194,709 A  *  3/1993  Ichikawa ............. B23K 11/253
                                                          219/109

FOREIGN PATENT DOCUMENTS

JP       2011-051003 A       3/2011
JP       2011051003 A   *   3/2011

* cited by examiner

*Primary Examiner* — Eric S. McCall
*Assistant Examiner* — Timothy P Graves
(74) *Attorney, Agent, or Firm* — MCGINN I.P. LAW GROUP, PLLC

(57) ABSTRACT

An electrode-misalignment detection device in a resistance welder that joins members together by holding them between opposing electrodes and applying pressure and electricity thereto includes an electrode misalignment detector that simultaneously approaches outer peripheries of both electrodes to detect misalignment thereof. The electrode misalignment detector includes a clamping member, a signal generator, a non-closed-state detector, and a misalignment determiner. The clamping member is movable toward the electrodes to clamp them from opposite radially outer sides and is settable in a predetermined closed state when the electrodes are located at appropriate positions. The signal generator outputs a movement state signal according to a movement state of the clamping member. The non-closed-state detector detects that the clamping member is in a state other than the predetermined closed state based on the movement state signal. The misalignment determiner determines electrode misalignment if the clamping member is not in the predetermined closed state.

4 Claims, 10 Drawing Sheets ically increase this Joule's heat, a plurality of (normally two) joint members are pressed and electrified while being held between opposing electrodes.
ELECTRODE-MISALIGNMENT DETECTION DEVICE IN RESISTANCE WELDER

CROSS-REFERENCE TO RELATED APPLICATIONS

The present application claims priority from Japanese Patent Application No. 2020-214001 filed on Dec. 23, 2020 and Japanese Patent Application No. 2021-149572 filed on Sep. 14, 2021, the entire contents of which are hereby incorporated by reference.

BACKGROUND

The disclosure relates to electrode-misalignment detection devices in resistance welders, and particularly, to a device that detects electrode misalignment in a resistance welder that joins a plurality of joint members together by clamping the joint members and applying pressure and electricity thereto.

Resistance welding is favorable as one of joining methods in terms of less distortion, good external appearance, and short welding time, and has been widely used particularly for manufacturing vehicle bodies in the automotive industry. It is known that resistance welding, also commonly called spot welding, is mainly achieved by melting joint members using Joule's heat produced in accordance with contact resistance between the joint members. In order to efficiently increase this Joule's heat, a plurality of (normally two) joint members are pressed and electrified while being held between opposing electrodes.

In vehicle-body mass production, a resistance welder equipped with the opposing electrodes and an electrode pressing device is attached to a manipulator of an industrial robot, and this robot is taught to resist-weld various locations of a vehicle body. Normally, one of the opposing electrodes is stationary, whereas the other is movable. In such vehicle-body mass production using an industrial robot, the electrode position (i.e., the position of an electrode in the radial direction thereof) may sometimes be misaligned due to the electrode colliding with another object or the electrode being welded to a joint member (i.e., base material). In particular, if the electrodes do not properly face each other, there may be problems, such as a welding defect due to reduced conduction efficiency and an occurrence of spatter due to a reduced spatter-less function.

In Japanese Unexamined Patent Application Publication (JP-A) No. 2011-51003, a conductive detection plate is disposed within the movable range of the robot. This detection plate is provided with a tolerance hole in which the electrodes are fittable, and electrical conductivity between the upper electrode and the detection plate is detectable. First, the robot is taught to fit the lower electrode into the tolerance hole, and then fit the upper electrode into the tolerance hole. If the lower electrode is misaligned with the upper electrode in the radial direction of the electrodes and the amount of misalignment becomes greater than the set gap between the tolerance hole and the upper electrode, the upper electrode comes into contact with the detection plate at the peripheral edge of the tolerance hole, thus causing electrical conductivity to occur between the upper electrode and the detection plate. As a result, if the upper electrode and the detection plate are electrically conductive with each other, it is confirmable that the upper electrode is misaligned with the lower electrode.

SUMMARY

An aspect of the disclosure provides an electrode-misalignment detection device in a resistance welder. The resistance welder is configured to join joint members together by holding the joint members between opposing electrodes and applying pressure and electricity to the joint members. The electrode-misalignment detection device includes an electrode misalignment detector configured to simultaneously approach outer peripheries of both of the opposing electrodes in a state where the resistance welder is located at a predetermined position so as to detect misalignment of each of the outer peripheries. The electrode misalignment detector includes a clamping member, a signal generator, a non-closed-state detector, and a misalignment determiner. The clamping member is movable toward the outer peripheries of the both of the opposing electrodes to clamp the opposing electrodes from opposite radially outer sides of the opposing electrodes, in a state where the resistance welder is located at the predetermined position, and is settable in a predetermined closed state in a case where each of the opposing electrodes is located at an appropriate position. The signal generator is configured to output a movement state signal according to a movement state of the clamping member toward the outer peripheries of the opposing electrodes. The non-closed-state detector is configured to detect that the clamping member moved toward the outer peripheries of the opposing electrodes is in a state other than the predetermined closed state based on the movement state signal from the signal generator. The misalignment determiner is configured to determine that either one of the electrodes is misaligned in a case the non-closed-state detector detects that the clamping member is in the state other than the predetermined closed state.

An aspect of the disclosure provides an electrode-misalignment detection device in a resistance welder. The resistance welder is configured to join joint members together by holding the joint members between opposing electrodes and applying pressure and electricity to the joint members. The electrode-misalignment detection device includes an electrode misalignment detector configured to simultaneously approach either of an outer periphery and a distal end of each of the opposing electrodes in a state where the resistance welder is located at a predetermined position so as to detect misalignment of the either of the outer periphery and the distal end. The electrode misalignment detector includes an electrode distance sensor and a misalignment determiner. The electrode distance sensor is positioned at a radially outer side of the opposing electrodes in the state where the resistance welder is located at the predetermined position and configured to detect a distance to either of the outer periphery and the distal end of the each of the opposing electrodes in a radial direction of the each of the opposing electrodes in a noncontact fashion. The misalignment determiner is configured to determine that one of the opposing electrodes is misaligned in a case the distance, detected by the electrode distance sensor, to the one of the opposing electrodes in the radial direction of the one of the opposing electrodes is smaller than or equal to a predetermined distance.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

In the electrode-misalignment detection device in the resistance welder described in JP-A No. 2011-51003, misalignment of the lower electrode is not detectable. Since electrode misalignment may possibly occur for both the upper electrode and the lower electrode in principle, there is a demand for a resistance-welder electrode-misalignment detection device that can detect misalignment of both the lower electrode and the upper electrode.

It is desirable to provide a resistance-welder electrode-misalignment detection device that can detect misalignment of either of two opposing electrodes.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1A:
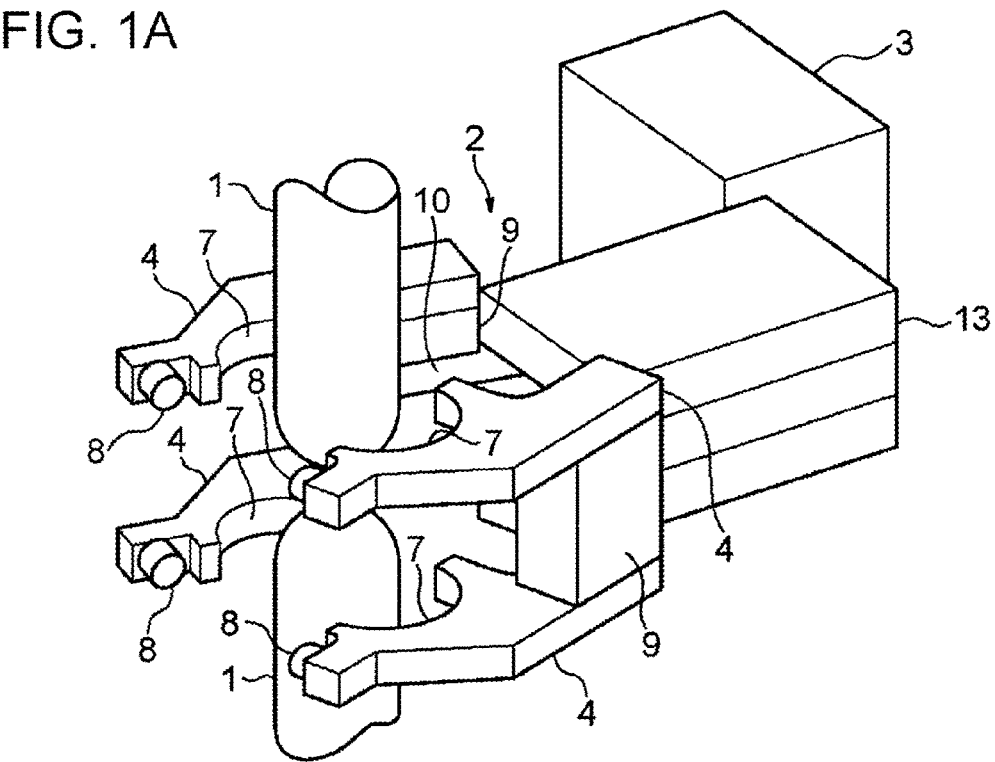
FIG. 1A and FIG. 1B are perspective views illustrating an electrode-misalignment detection device in a resistance welder according to an embodiment of the disclosure.
Figure 1B:
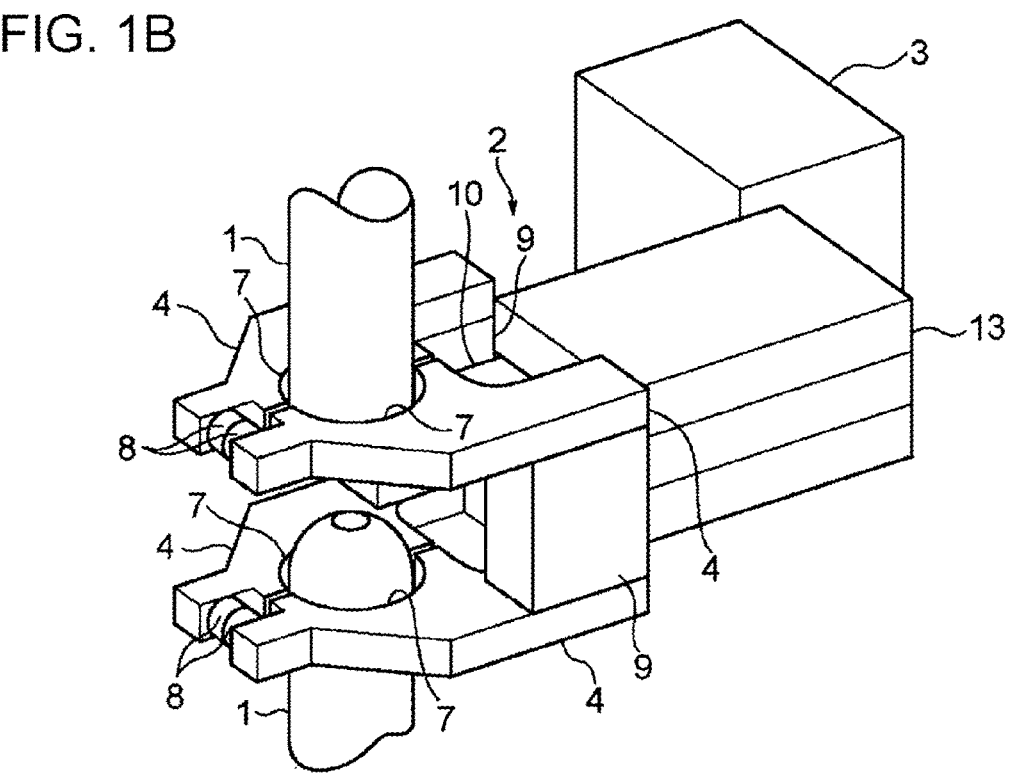
Figure 2A:
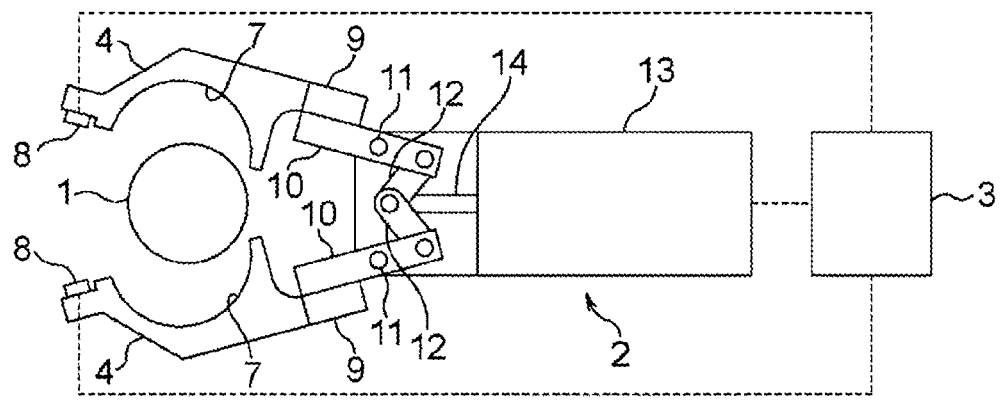
FIG. 2A and FIG. 2B are partially cross-sectional plan views of the electrode-misalignment detection device in FIG. 1A and FIG. 1B.
Figure 2B:
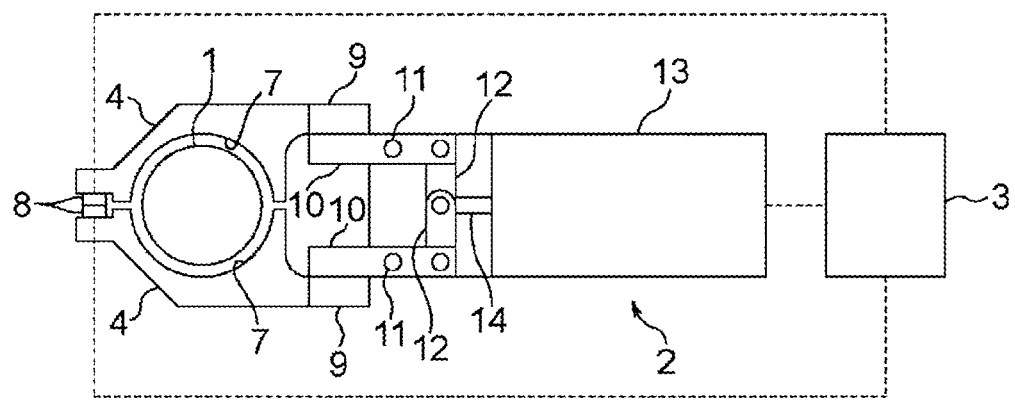

FIG. 1A and FIG. 1B are perspective views illustrating a relevant part of an electrode-misalignment detection device 2 according to a first embodiment of the disclosure. FIG. 2A and FIG. 2B are partially cross-sectional plan views of the electrode-misalignment detection device 2 in FIG. 1A and FIG. 1B. FIG. 1A and FIG. 2A illustrate clamping members 4 to be described later in an open state, and FIG. 1B and FIG. 2B illustrate the clamping members 4 in a closed state. The resistance welder according to this embodiment is similar to an existing resistance welder in that a plurality of joint members (not illustrated) to be joined to each other are held between upper and lower electrodes 1 illustrated in the drawings and are electrified while being pressed by the electrodes 1, thereby melting and solidifying a region around the contact interface between the joint members and ultimately welding the joint members together. Normally, one of the opposing electrodes 1 is stationary, whereas the other is movable. Although the resistance welder excluding the electrodes 1 is omitted in the following embodiment including the aforementioned drawings, the resistance welder according to this embodiment is similar to a common resistance welder in that, for example, the resistance welder includes a pressing device (i.e., normally also serving as a moving device for the electrodes 1) for the electrodes 1.

The resistance welder according to this embodiment is also similar to JP-A No. 2011-51003 described above in that the resistance welder is attached to a manipulator of an industrial robot (not illustrated). An industrial robot commonly called a multi-axis robot can freely move a manipulator within a movable range by teaching, and performs resistance welding by controlling the resistance welder attached to the manipulator and the electrodes 1 to various positions and various orientations, holding the joint members between the electrodes 1 in this state, and applying pressure and electricity to the joint members. Furthermore, this embodiment is similar to JP-A No. 2011-51003 described above in that the electrodes 1 (i.e., the resistance welder) are moved and fixed to the position of the electrode-misalignment detection device 2 illustrated in the drawings, and the electrode-misalignment detection device 2 detects whether the electrodes 1 are misaligned particularly in the radial direction of the electrodes 1. This position is defined as a predetermined determination position (i.e., predetermined position). At this predetermined determination position, the electrodes 1 are fixed to predetermined nearby positions that face each other. The operational control and the determination of the electrode-misalignment detection device 2 are to be executed by a controller 3 having an arithmetic processing function. The controller 3 may be integrated with either of the resistance welder and a controller of the industrial robot, or may be independent therefrom.

The electrode-misalignment detection device 2 includes the clamping members 4 that are to be moved toward the outer peripheral side of the electrodes 1 from opposite radially outer sides of the electrodes 1 of the resistance welder fixed at the aforementioned predetermined determination position. The clamping members 4 according to this embodiment are two pairs of members that extend substantially orthogonally to the electrode extending direction at the opposite radially outer sides of the electrodes 1. As illustrated in FIG. 1A and FIG. 1B, the two pairs of clamping members 4 are disposed for the upper and lower electrodes 1, respectively. For example, it is clear from FIG. 2B that the clamping members 4 are provided with cross-sectionally semicircular recesses 7 having a predetermined gap relative to the outer periphery of each electrode 1 at an appropriate position in a state where the clamping members 4 have been moved toward the electrode 1 to clamp the electrode 1. In a case where the side with the recesses 7 is defined as the distal ends of the clamping members 4 and the side opposite the distal ends is defined as base ends, opposing surfaces at the distal ends beyond the recesses 7 are provided with determination electrodes 8. It is clear from FIG. 2B that, in a state where the clamping members 4 have been moved toward the electrode 1 at an appropriate position to clamp the electrode 1, the determination electrodes 8 facing each other are in contact with each other. This state of the clamping members 4 will be defined as a predetermined closed state. For example, the base ends of the two pairs of upper and lower clamping members 4 in FIG. 1A and FIG. 1B are coupled to each other by coupling members 9 having a predetermined length in the electrode extending direction. Moreover, each coupling member 9 is coupled to an arm member 10 extending in the extending direction of the corresponding clamping member 4, and a rotation shaft 11 extending in the electrode extending direction extends through an intermediate area of the arm member 10 in the extending direction thereof. The end of each arm member 10 opposite the end coupled to the corresponding clamping member 4 is rotatably coupled to a link member 12. The end of the link member 12 opposite the end coupled to the corresponding arm member 10 is rotatably coupled to the distal end of a rod member 14 of an extending-retracting device 13. The rod member 14 of the extending-retracting device 13 extends and retracts in the radial direction of each electrode 1 at an appropriate position. The extending-retracting device 13 is constituted of, for example, an air cylinder.

As illustrated in FIG. 2A, when the rod member 14 of the extending-retracting device 13 is in the extended state, the distal ends of the clamping members 4 of each pair are disposed away from each other, as illustrated in FIG. 1A and FIG. 2A, and the recesses 7 of the clamping members 4 are also open. In this state, the electrodes 1 of the resistance welder are moved and fixed to, for example, the position illustrated in FIG. 1A, that is, the predetermined determination position, and the rod member 14 of the extending-retracting device 13 is retracted in this state. Accordingly, as the link members 12 rotate, the arm members 10 and the clamping members 4 rotate around the rotation shafts 11 to cause the distal ends to close, and the clamping members 4 of each pair are moved toward the outer periphery of the corresponding electrode 1 from the opposite radially outer sides of the electrode 1. Thus, the outer periphery of each electrode 1 is clamped by (the recesses 7 of) the corresponding pair of clamping members 4, as illustrated in FIG. 1B and FIG. 2B. When the electrode 1 at the appropriate position is accommodated within the recesses 7 of the clamping members 4, the clamping members 4 and the electrode 1 do not come into contact with each other, so that the clamping members 4 are in the aforementioned predetermined closed state, whereby the determination electrodes 8 provided on the clamping members 4 come into contact with each other at this point. Consequently, when the determination electrodes 8 are in a conductive state, the clamping members 4 of each pair are in the predetermined closed state. Based on this fact, it is determined that the electrodes 1 are disposed at predetermined positions in the radial direction thereof.

Figure 3A:
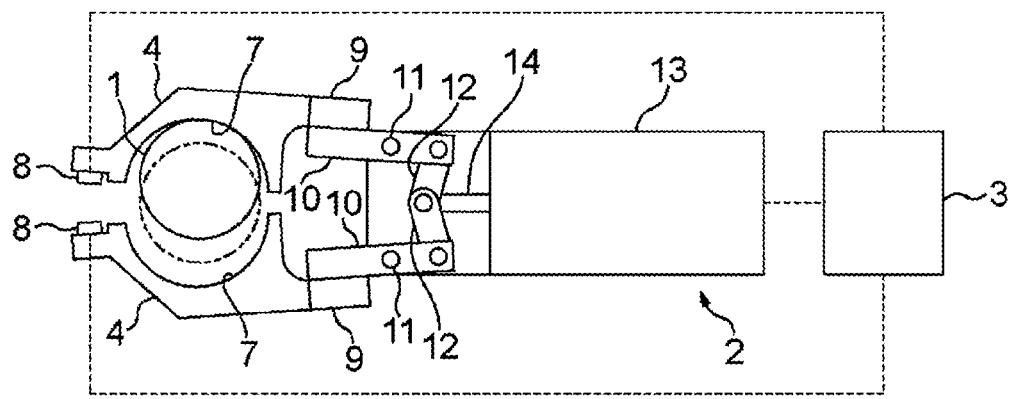
FIG. 3A and FIG. 3B illustrate the operation of the electrode-misalignment detection device in FIG. 1A to FIG. 2B.
Figure 3B:
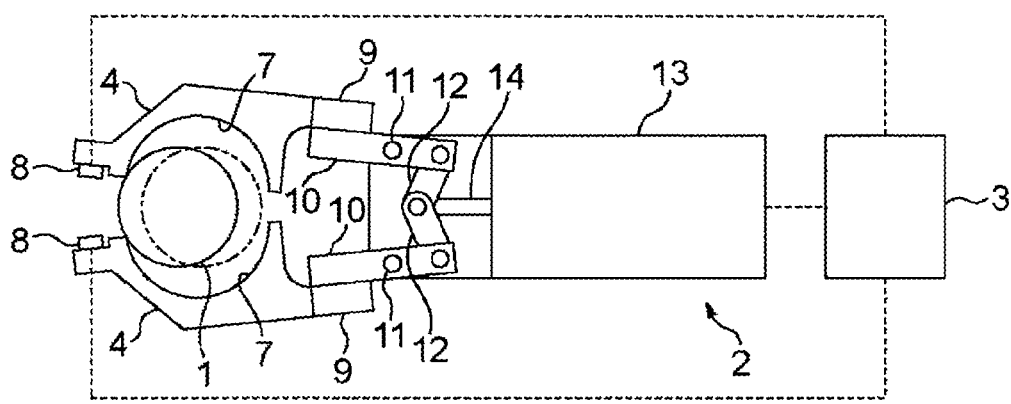

In contrast, for example, if an electrode 1 is misaligned upward in FIG. 3A relative to an electrode 1 disposed at an appropriate position indicated with a double-dot chain line in FIG. 3A, since the aforementioned electrode-misalignment detection device 2 is fixed in position, when the clamping members 4 close from the open state in FIG. 2A, the upper clamping member 4 in FIG. 3A comes into contact with the upper side surface of the electrode 1, such that the clamping members 4 forming the pair do not close any further. In other words, the aforementioned predetermined closed state is not achieved. If the clamping members 4 forming the pair are not set in the predetermined closed state, the determination electrodes 8 do not come into contact with each other, thus resulting in a nonconductive state between the determination electrodes 8. Therefore, regardless of the fact that the electrode 1 is clamped between the clamping members 4 forming the pair, if the determination electrodes 8 are in a nonconductive state, it can be determined that either of the electrodes 1 is misaligned. Likewise, for example, if an electrode 1 is misaligned leftward in FIG. 3B relative to an electrode 1 disposed at an appropriate position indicated with a double-dot chain line in FIG. 3B, the distal ends of the clamping members 4 come into contact with the left side surface of the outer periphery of the electrode 1, such that the clamping members 4 forming the pair do not close any further, and the aforementioned predetermined closed state is not achieved. If the clamping members 4 forming the pair are not set in the predetermined closed state, the determination electrodes 8 do not come into contact with each other, thus resulting in a nonconductive state between the determination electrodes 8. Therefore, regardless of the fact that the electrode 1 is clamped between the clamping members 4 forming the pair, if the determination electrodes 8 are in a nonconductive state, it can be determined that either of the electrodes 1 is misaligned. When it is determined that either of the electrodes 1 is misaligned and a notification about such misalignment is provided, the direction of misalignment of the electrode 1 can be determined by observing the contact state between the electrode 1 and the clamping members 4. Therefore, an operator can subsequently correct the electrode position to regain the normal resistance welding process.

Figure 4:
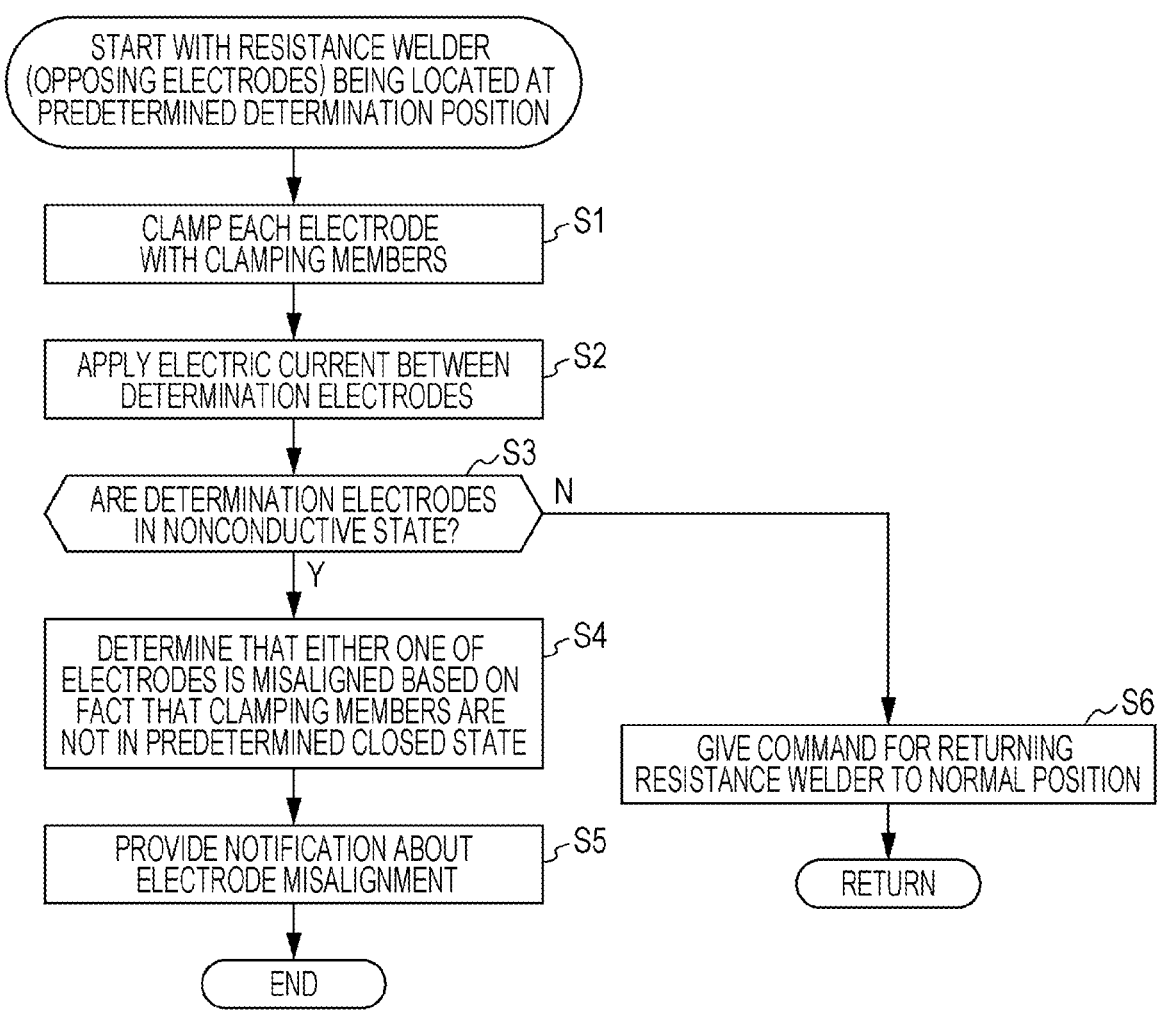
FIG. 4 is a flowchart of arithmetic processing to be executed by a controller of the electrode-misalignment detection device in FIG. 1A and FIG. 1B.

As mentioned above, the operational control and the electrode misalignment determination of the electrode-misalignment detection device 2 according to this embodiment are to be executed by the controller 3. The controller 3 includes an arithmetic processor that contains a computer system for performing arithmetic processing and having a sophisticated arithmetic processing function, a storage device that stores programs and data, and an input-output device responsible for receiving and outputting information from and to various kinds of sensors and an external device. FIG. 4 is a flowchart illustrating arithmetic processing to be executed by the controller 3 for the operation and the determination of the electrode-misalignment detection device 2. This arithmetic processing starts in a state where the resistance welder (i.e., the opposing electrodes 1) is fixed to the aforementioned predetermined determination position. First, in step S1, each pair of clamping members 4 is moved toward the outer periphery of the corresponding electrode 1 to clamp the electrode 1.

The processing then proceeds to step S2 to apply electric current between the determination electrodes 8.

Subsequently, the processing proceeds to step S3 to determine whether the determination electrodes 8 are in a nonconductive state. If the determination electrodes 8 are in a nonconductive state, the processing proceeds to step S4. Otherwise, the processing proceeds to step S6.

In step S4, it is determined that either of the electrodes 1 is misaligned based on the fact that the clamping members 4 of the corresponding pair are not in the predetermined closed state. Subsequently, the processing proceeds to step S5.

In step S5, a notifier (not illustrated) provides a notification about the electrode misalignment, and the processing ends. An example of the notifier is any one of a display, a signal light, and a buzzer.

On the other hand, in step S6, a command is given to cause the resistance welder to return to its normal position, and the processing subsequently returns to the normal resistance welding process.

According to this arithmetic processing, when the resistance welder (i.e., the opposing electrodes 1) is moved and fixed to the predetermined determination position, the clamping members 4 of each pair are moved toward the outer periphery of the corresponding electrode 1 to clamp the electrode 1, and in this state, electricity is applied to the determination electrodes 8. In this case, if the determination electrodes 8 are in an conductive state, the electrode 1 is located at an appropriate position since the clamping members 4 are in the aforementioned predetermined closed state. Thus, the electrode 1 is not misaligned, so that the resistance welder can be returned to its normal position, whereby, for example, vehicle-body mass production can be continuously performed. In contrast, if the determination electrodes 8 are in a nonconductive state, the clamping members 4 of each pair are not in the predetermined closed state, so that it can be determined that either of the electrodes 1 is misaligned since the electrode 1 is not located at an appropriate position. Then, when the electrode misalignment is determined, a notification about the electrode misalignment is provided by, for example, any one of a display, a signal light, and a buzzer. When the notification about the electrode misalignment is provided, for example, the operator can correct the misalignment of the electrode 1 to regain the normal resistance welding process. Accordingly, the resistance welding quality can be ensured and improved. In one embodiment, the processes in step S3 and step S4 of the arithmetic processing executed by the controller 3 in FIG. 4 may serve as processes performed by a "signal generator", a "determination-electrode current applier", a "nonconductive-state detector", a "non-closed-state detector", and a "misalignment determiner".

The electrode-misalignment detection device 2 according to this embodiment may be modified as follows. For example, in a case where the extending-retracting device 13 includes an electric motor, a ball screw attached to a rotation shaft of the electric motor, and a ball screw nut screwed to the ball screw, and is constituted by attaching the rod member 14 to the ball screw nut to be moved in the extending direction of the ball screw by using a thrust force of the screw, when the clamping members 4 are brought into contact with the outer periphery of each electrode 1 during the closing operation of the clamping members 4 and become non-movable any further, the ball screw nut is stopped from moving at that point so that the ball screw is stopped from rotating at that point. Thus, for example, in a case where the amount of rotation of the electric motor that is rotating the ball screw is detected by using, for example, an encoder and the rotation stops just before the rotation for the predetermined closed state of the clamping members 4, it may be determined that the clamping members 4 are in contact with the outer periphery of each electrode 1 and that either of the opposing electrodes 1 is misaligned.

Accordingly, in the electrode-misalignment detection device 2 in the resistance welder according to this embodiment, for example, it can be determined that either of the electrodes 1 is misaligned based on the fact that the clamping members 4 simultaneously moved toward the outer peripheries of the electrodes 1 to clamp both of the opposing electrodes 1 are in a state other than the predetermined closed state, that is, the clamping members 4 are not completely closed due to the misalignment of the electrode 1, in a state where the resistance welder (i.e., the opposing electrodes 1) attached to the manipulator of the industrial robot is located at the predetermined position. Consequently, misalignment of either of the two opposing electrodes 1 can be detected.

Furthermore, it can be determined that the clamping members 4 are not in the predetermined closed state, that is, the clamping members 4 are not completely closed due to the misalignment of the electrode 1, based on the fact that the determination electrodes 8 to be in contact with each other when the clamping member 4 is in the predetermined closed state is in a nonconductive state. Consequently, the misalignment detection accuracy for the two opposing electrodes 1 can be improved.

Figure 5:
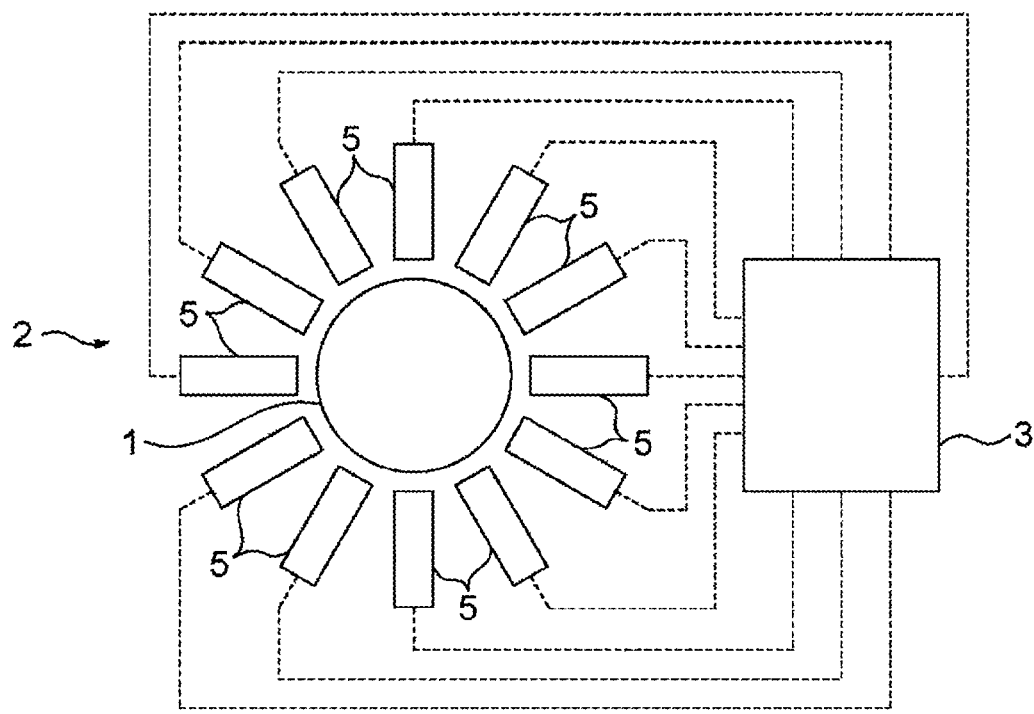
FIG. 5 schematically illustrates an electrode-misalignment detection device in a resistance welder according to an embodiment of the disclosure.

FIG. 5 schematically illustrates a relevant part of an electrode-misalignment detection device 2 according to a second embodiment of the disclosure. The electrode-misalignment detection device 2 according to this embodiment includes a plurality of electrode distance sensors located at the radially outer side of either of the outer periphery and the distal end of each electrode 1 in a state where the resistance welder (i.e., the opposing electrodes 1) is moved and fixed to the aforementioned predetermined determination position. The electrode distance sensors are capable of detecting the distance to either of the outer periphery and the distal end of each electrode 1 in a noncontact fashion and are constituted of proximity switches 5 in this embodiment. It is known that each proximity switch 5 is a sensor that creates, for example, a magnetic field around a coil and outputs a signal by detecting a change in inductance or loss occurring as metal approaches the magnetic field. For example, if metal approaching the proximity switch 5 is separated therefrom by a predetermined distance or smaller, the proximity switch 5 outputs an ON signal. In other words, the predetermined distance is the distance it takes for the detection signal of the proximity switch 5 to become an ON signal. In FIG. 5, the plurality of (i.e., 12 in FIG. 5) of proximity switches 5 are equally disposed facing each electrode 1 at the radially outer side of either of the outer periphery and the distal end of the electrode 1 moved or fixed to the aforementioned predetermined determination position, and output signals from the proximity switches 5 are read by the controller 3. In this case, the distance to each proximity switch 5 in the radial direction of each electrode 1 from either of the outer periphery and the distal end of the electrode 1 at an appropriate position corresponds to a sum value of the aforementioned predetermined distance, that is, the distance it takes for the proximity switch 5 to be turned on, and the predetermined gap in FIG. 1B. In contrast, if either of the electrodes 1 is misaligned in the radial direction by, for example, a distance corresponding to the predetermined gap in FIG. 1B, an ON signal is output from any one of the proximity switches 5, so that it is possible to detect and determine whether either of the electrodes 1 is misaligned in any of the directions based on the ON signal from the relevant proximity switch 5.

Figure 6:
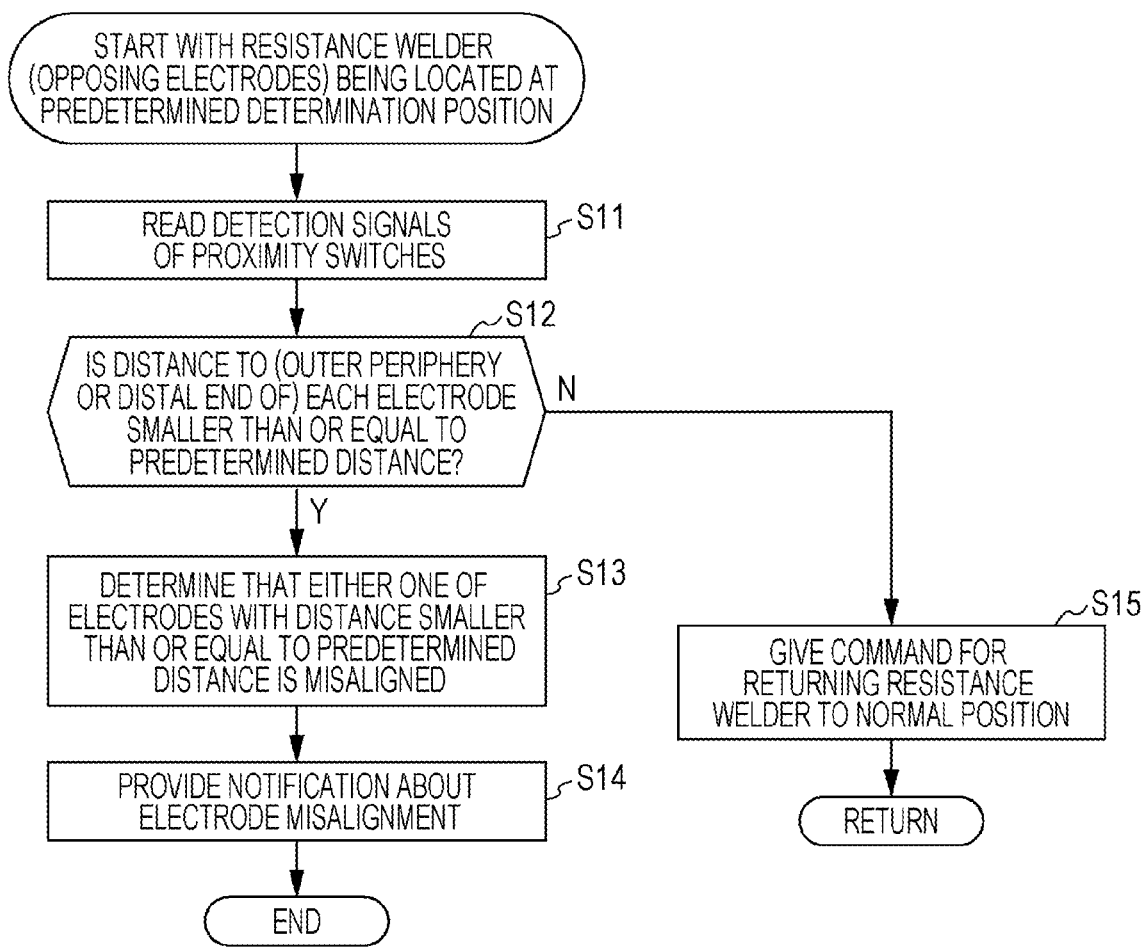
FIG. 6 is a flowchart of arithmetic processing to be executed by the controller of the electrode-misalignment detection device in FIG. 5.

Similar to the controller 3 according to the first embodiment, the controller 3 according to this embodiment includes an arithmetic processor that contains a computer system for performing arithmetic processing and having a sophisticated arithmetic processing function, a storage device that stores programs and data, and an input-output device responsible for receiving and outputting information from and to various kinds of sensors and an external device. FIG. 6 is a flowchart illustrating arithmetic processing to be executed by the controller 3 for the operation and the determination of the electrode-misalignment detection device 2. This arithmetic processing starts in a state where the resistance welder (i.e., the opposing electrodes 1) is fixed to the aforementioned predetermined determination position. First, in step S11, detection signals of the proximity switches 5 are read.

The processing then proceeds to step S12 to determine whether the distance to (either of the outer periphery and the distal end) of each electrode 1 is smaller than or equal to the predetermined distance, that is, whether the detection signal of each proximity switch 5 is an ON signal. If the detection signal of the proximity switch 5 is an ON signal, that is, if the distance to (either of the outer periphery and the distal end) of each electrode 1 is smaller than or equal to the predetermined distance, the processing proceeds to step S13. Otherwise, the processing proceeds to step S15.

In step S13, it is determined that either of the electrodes 1 with the distance to either of the outer periphery and the distal end being smaller than or equal to the predetermined distance is misaligned. The processing then proceeds to step S14.

In step S14, a notifier (not illustrated) provides a notification about the electrode misalignment, and the processing ends. An example of the notifier is any one of a display, a signal light, and a buzzer.

On the other hand, in step S15, a command is given to cause the resistance welder to return to its normal position, and the processing subsequently returns to the normal resistance welding process.

According to this arithmetic processing, when the resistance welder (i.e., the opposing electrodes 1) is moved and fixed to the predetermined determination position, the detection signals of the proximity switches 5 are read. In this case, if the detection signals of all the proximity switches 5 are OFF signals, each electrode 1 is located at an appropriate position since either of the outer periphery and the distal end of the electrode 1 is located away from the proximity switches 5 by the predetermined distance. Thus, the electrode 1 is not misaligned, so that the resistance welder is returned to its normal position, whereby, for example, vehicle-body mass production can be continuously performed. In contrast, if the detection signal of any one of the proximity switches 5 is an ON signal, the distance between either of the outer periphery and the distal end of the relevant electrode 1 and the proximity switch 5 outputting the ON signal is smaller than or equal to the predetermined distance, so that it can be determined that the electrode 1 is misaligned since the electrode 1 is not located at the appropriate position. Then, when the electrode misalignment is determined, a notification about the electrode misalignment is provided by, for example, any one of a display, a signal light, and a buzzer. When the notification about the electrode misalignment is provided, for example, the operator can correct the misalignment of the electrode 1 to regain the normal resistance welding process. Accordingly, the resistance welding quality can be ensured and improved. In one embodiment, the processes in step S12 and step S13 of the arithmetic processing executed by the controller 3 in FIG. 6 may serve as processes performed by a "misalignment determiner".

In the case where the electrode-misalignment detection device 2 in FIG. 5 has the proximity switches 5 disposed at the radially outer side of either of the outer periphery and the distal end of each electrode 1, for example, the plurality of proximity switches 5 illustrated in FIG. 5 may be retracted away from the electrode 1 in the radial direction thereof, the electrode 1 may be moved or fixed to the position (i.e., the predetermined determination position) in FIG. 5 in this state, and the proximity switches 5 may be subsequently advanced in the radial direction of the electrode 1 so as to be brought close to the radially outer side of either of the outer periphery and the distal end of the electrode 1. However, for example, it is realistic that the robot and the resistance welder be operated such that the proximity switches 5 are fixed to the positions in FIG. 5 and the two electrodes 1 disposed with a distance therebetween in the opposing direction are brought close to each other at the center position of the plurality of proximity switches 5, whereby the plurality of proximity switches 5 are located at the radially outer side of either of the outer periphery and the distal end of the electrode 1.

Figure 7:
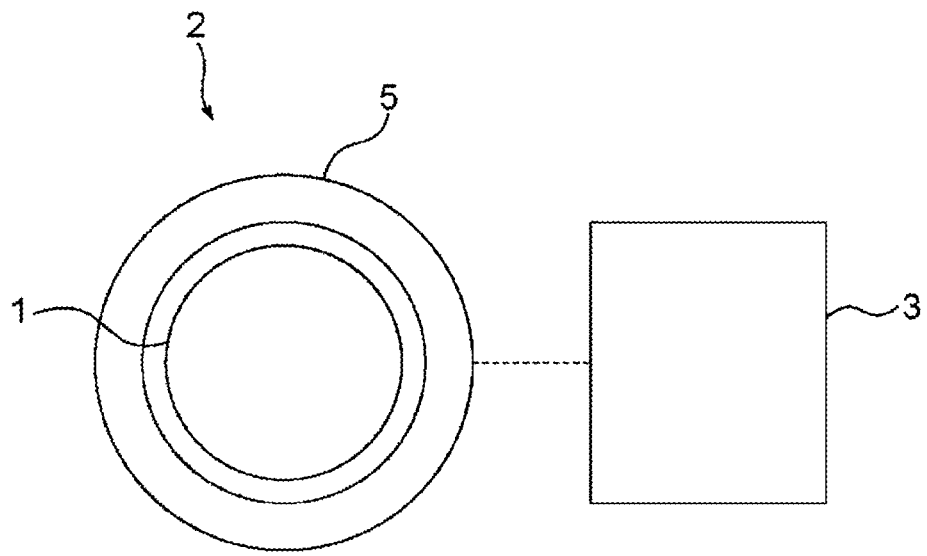
FIG. 7 schematically illustrates a first modification of the electrode-misalignment detection device in FIG. 5.

FIG. 7 illustrates a modification of the electrode-misalignment detection device 2 in FIG. 5. As an alternative to the electrode-misalignment detection device 2 in FIG. 5 in which the plurality of proximity switches 5 are equally disposed at the radially outer side of either of the outer periphery and the distal end of each electrode 1, a single ring-shaped proximity switch 5 is disposed at the radially outer side of either of the outer periphery and the distal end of each electrode 1 in FIG. 7. For example, this ring-shaped proximity switch 5 is configured to output an ON signal when the distance between the inner periphery of the proximity switch 5 and either of the outer periphery and the distal end of the electrode 1 becomes smaller than or equal to a predetermined distance, so that the proximity switch 5 can detect misalignment of the electrode 1 similarly to the above-described arithmetic processing in FIG. 6. The electrode-misalignment detection device 2 in FIG. 7 is not capable of detecting the direction of misalignment of each electrode 1 simply based on the detection signal of the proximity switch 5. Furthermore, in the electrode-misalignment detection device 2 in FIG. 7, the electrodes 1 disposed with a distance therebetween in the opposing direction are brought close to each other by being moved within the ring-shaped proximity switch 5, so that the electrodes 1 are moved and fixed to the predetermined determination position.

Accordingly, in the electrode-misalignment detection device 2 in the resistance welder according to this embodiment, for example, in a state where the resistance welder (i.e., the opposing electrodes 1) attached to a manipulator of an industrial robot is located at the predetermined position, the proximity switch 5 (i.e., an electrode distance sensor) simultaneously moving toward either of the outer periphery and the distal end of each of the opposing electrodes 1 and located at the radially outer side of each electrode 1 detects the distance to the electrode 1 in the radial direction thereof in a noncontact fashion. If the detected distance to each electrode 1 in the radial direction thereof is smaller than or equal to the predetermined distance, it can be determined that the electrode 1 is misaligned. Thus, misalignment of either of the two opposing electrodes 1 can be detected.

Figure 8:
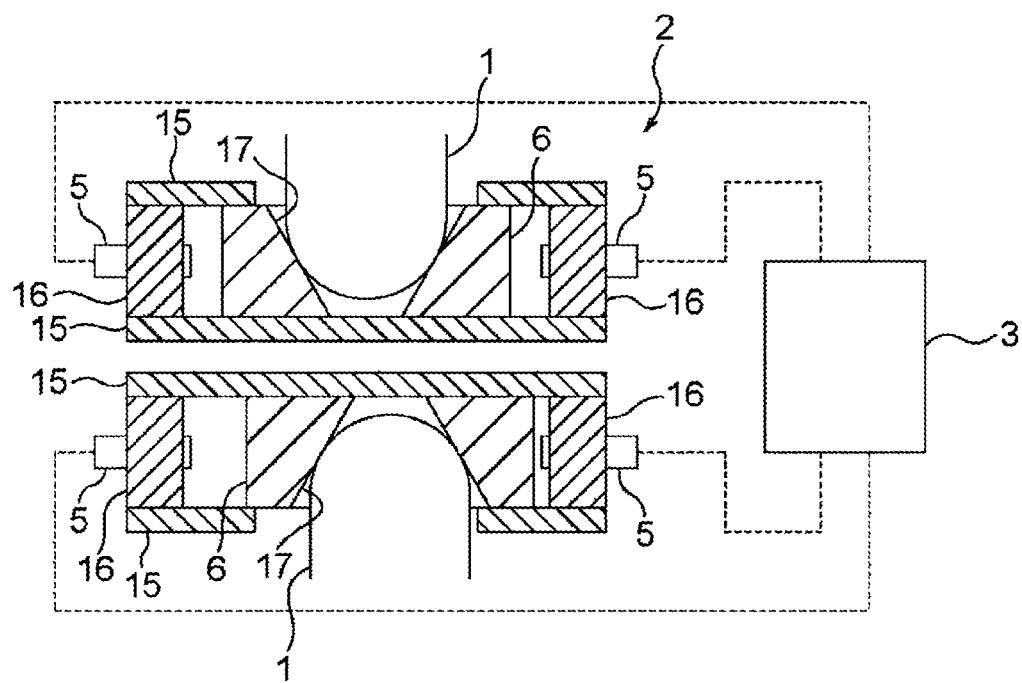
FIG. 8 schematically illustrates a second modification of the electrode-misalignment detection device in FIG. 5.

FIG. 8 is a cross-sectional view illustrating another modification of the electrode-misalignment detection device 2 in FIG. 5, as viewed from the radial direction of the electrodes 1. In FIG. 8, the disposition of the proximity switches 5 (i.e., electrode distance sensors) as viewed from the electrode extending direction is generally similar to that in FIG. 5. In this electrode-misalignment detection device 2, the proximity switches 5 are located at the radially outer side of the distal end of each electrode 1, and an electrode-position reflection member 6 is interposed between the proximity switches 5 and the distal end of each electrode 1. Each electrode-position reflection member 6 is formed of, for example, a circular metallic plate having a predetermined thickness in the electrode extending direction, and the proximity switches 5 are disposed facing the outer peripheral surface of the electrode-position reflection member 6. The electrode-position reflection member 6 is disposed in a slidable manner between two support plates 15 separated from each other by a predetermined dimension in the electrode extending direction, and is returned to a position facing the distal end of the electrode 1 at an appropriate position by a spring member (not illustrated). Each proximity switch 5 is embedded in a distance maintaining wall 16 fixed between the two support plates 15 at the radially outer side of the corresponding electrode-position reflection member 6. Each electrode-position reflection member 6 is provided with a depression (i.e., a hole) 17 at the center of a plate surface facing the distal end of the corresponding electrode 1. The depression 17 has a cross-sectionally truncated conical shape and tapers in the electrode extending direction. The distal end of the electrode 1 moved or fixed to the aforementioned predetermined determination position is inserted into the depression 17. Because the distal end of each electrode 1 in this embodiment is semicircular, when the semicircular distal end is inserted into the depression 17 having the tapered truncated conical shape in cross section, the electrode-position reflection member 6 is moved in the radial direction of the electrode 1 in accordance with the position of the distal end of the electrode 1. In FIG. 8, the upper electrode 1 is located at an appropriate position, whereas the lower electrode 1 is misaligned rightward in the radial direction. When the distance to the outer periphery of the electrode-position reflection member 6 moved in the radial direction of each electrode 1 in accordance with the position of the distal end of the electrode 1 becomes smaller than or equal to a predetermined distance, the proximity switches 5 output ON signals. Therefore, in the electrode-misalignment detection device 2, misalignment of an electrode 1 can be detected similarly to the above-described arithmetic processing in FIG. 6.

Accordingly, in the electrode-misalignment detection device 2 in the resistance welder according to this embodiment, for example, although it is difficult to detect the distance to the distal end of each electrode 1 in the radial direction thereof in a case where the distal end is semicircular or tapered in this manner, the distance, in the radial direction of the electrode 1, to the outer periphery of the electrode-position reflection member 6 that reflects the position of the distal end by moving in the radial direction of the electrode 1 can be detected relatively easily by the proximity switches 5 (i.e., electrode distance sensors), so that the electrode-misalignment detection device 2 can be shortened in the electrode extending direction, as compared with a case where the distance to the outer periphery of the electrode 1 in the radial direction thereof is to be detected.

Figure 9A:
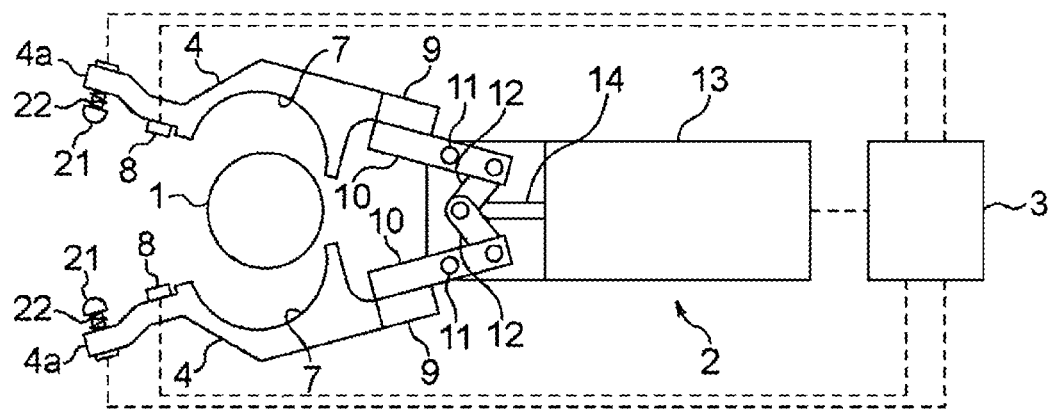
FIG. 9A and FIG. 9B are partially cross-sectional plan views illustrating an electrode-misalignment detection device in a resistance welder according to an embodiment of the disclosure.
Figure 9B:
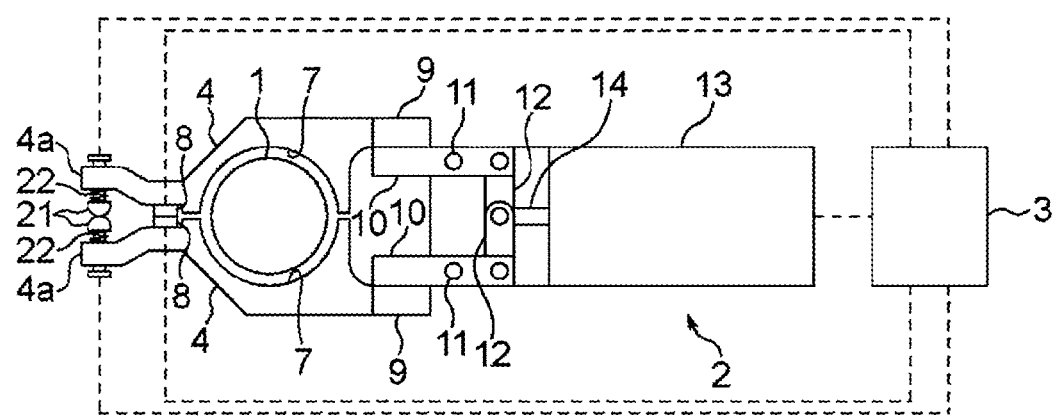

Next, an electrode-misalignment detection device 2 according to a third embodiment of the disclosure will be described. The electrode-misalignment detection device 2 according to this embodiment is a modification of the first embodiment described above. FIG. 9A and FIG. 9B are partially cross-sectional plan views illustrating a relevant part of the electrode-misalignment detection device 2 according to this embodiment. FIG. 9A illustrates the clamping members 4 in an open state, and FIG. 9B illustrates the clamping members 4 in a closed state. Because the electrode-misalignment detection device 2 according to this embodiment is similar to the electrode-misalignment detection device 2 according to the first embodiment, identical components will be given the same reference signs, and detailed descriptions thereof will be omitted. In this embodiment, the clamping members 4 are extended in the opposite direction from the rotation shafts 11 and thus each have an extension segment 4a additionally provided with a movable determination electrode 21. In order to distinguish the movable determination electrodes 21 and the aforementioned stationary determination electrodes 8 from each other, the latter (stationary) will be defined as first determination electrodes 8, whereas the former (movable) will be defined as second determination electrodes 21. The configuration at the base end of each clamping member 4 relative to each first determination electrode 8 is the same as that in the first embodiment.

The extension segments 4a of the clamping members 4 extend to spread out in the opening direction of the clamping members 4 relative to where the first determination electrodes 8 are attached. A shaft of each second determination electrode 21 is fitted through a through-hole extending through the corresponding extension segment 4a in the clamping-member opening-closing direction. An end of the shaft in the clamping-member opening direction is provided with a large-diameter part for retaining the shaft. The distal end of the shaft of each second determination electrode 21 in the clamping-member closing direction is provided with a semicircular electrode. A coil spring 22 surrounding the shaft is interposed between the electrode and the extension segment 4a. Thus, the second determination electrode 21 is biased by the coil spring 22 such that the electrode protrudes in the clamping-member closing direction from the extension segment 4a, and slides within the through-hole when the second determination electrode 21 receives a force acting in the clamping-member opening direction. Similar to the first determination electrodes 8, the second determination electrodes 21 also receive electric current from the controller 3 for determining a conductive state.

The protruding distal end of the electrode of each second determination electrode 21 biased by the coil spring 22 is set at a position where the distal end protrudes further than the protruding distal end of each first determination electrode 8 by a predetermined dimension. In other words, when the opposing clamping members 4 close, the second determination electrodes 21 come into contact with each other twice as early as the first determination electrodes 8 coming into contact with each other due to the predetermined dimension. This implies that the second determination electrodes 21 come into contact with each other even when the opposing clamping members 4 are located away from each other. If the opposing clamping members 4 can be further closed after the second determination electrodes 21 come into contact with each other, the second determination electrodes 21 slide along the through-holes in the clamping-member opening direction. The dimension by which the electrodes of the second determination electrodes 21 protrude relative to the first determination electrodes 8 is changeable by positionally adjusting the large-diameter parts provided at the ends of the shafts. The large-diameter parts can be positionally adjusted by using, for example, so-called double nuts as the large-diameter parts. Furthermore, when the clamping members 4 are in the closed state, as illustrated in FIG. 9B, a predetermined gap is formed between the recesses 7 and each electrode 1 located at an appropriate position. In other words, in view of the clamping-member opening-closing direction, the first determination electrodes 8 come into contact with each other when the clamping members 4 are closed even if either of the electrodes 1 is misaligned, so long as the electrode 1 is within the range of this predetermined gap. In this embodiment, if an electrode 1 exists within this predetermined range, it is defined that the electrode 1 is located at an appropriate position.

Figure 10A:
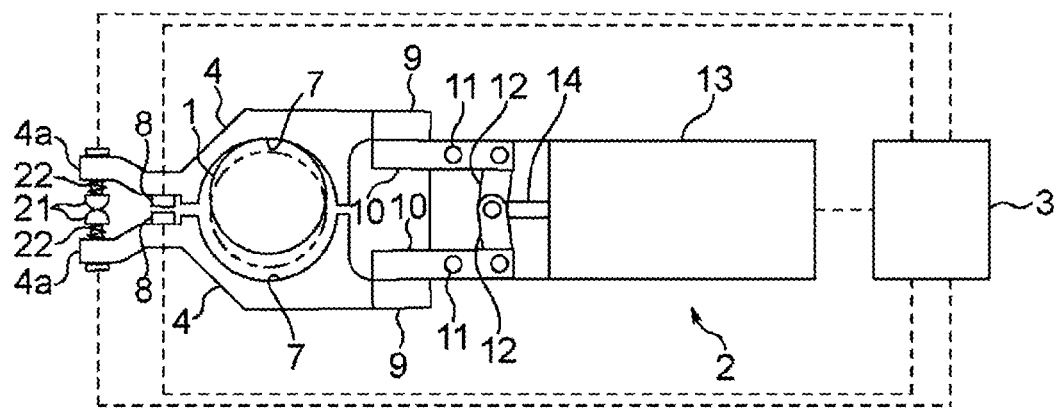
FIG. 10A and FIG. 10B illustrate the operation of the electrode-misalignment detection device in FIG. 9A and FIG. 9B.
Figure 10B:
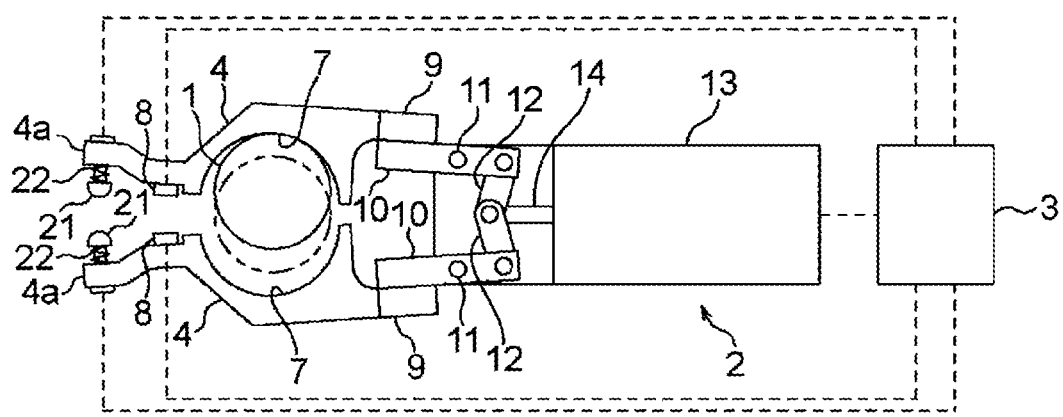

In contrast, when the amount of misalignment of an electrode 1 exceeds the predetermined gap between the electrode 1 and the recesses 7, the first determination electrodes 8 do not come into contact with each other, as illustrated in FIG. 10A. However, if the amount of misalignment is substantially within a sum value of the dimension by which the electrodes of the second determination electrodes 21 protrude relative to the protruding distal ends of the first determination electrodes 8 and the aforementioned predetermined gap, the second determination electrodes 21 come into contact with each other. Furthermore, when the amount of misalignment of the electrode 1 exceeds the sum value of the predetermined gap of the recesses 7 relative to the electrode 1 at an appropriate position and the dimension by which the electrodes of the second determination electrodes 21 protrude relative to the protruding distal ends of the first determination electrodes 8, the first determination electrodes 8 do not come into contact with each other, and the second determination electrodes 21 also do not come into contact with each other, as illustrated in FIG. 10B. Similar to the first embodiment, in this embodiment, in a state where determination electric current is applied between the first determination electrodes 8 and between the second determination electrodes 21, if the second determination electrodes 21 are in an conductive state even when the first determination electrodes 8 are in a nonconductive state, it is determined that the electrode 1 is misaligned within a permissible range, and the relevant resistance welding process is not to be stopped.

Figure 11:
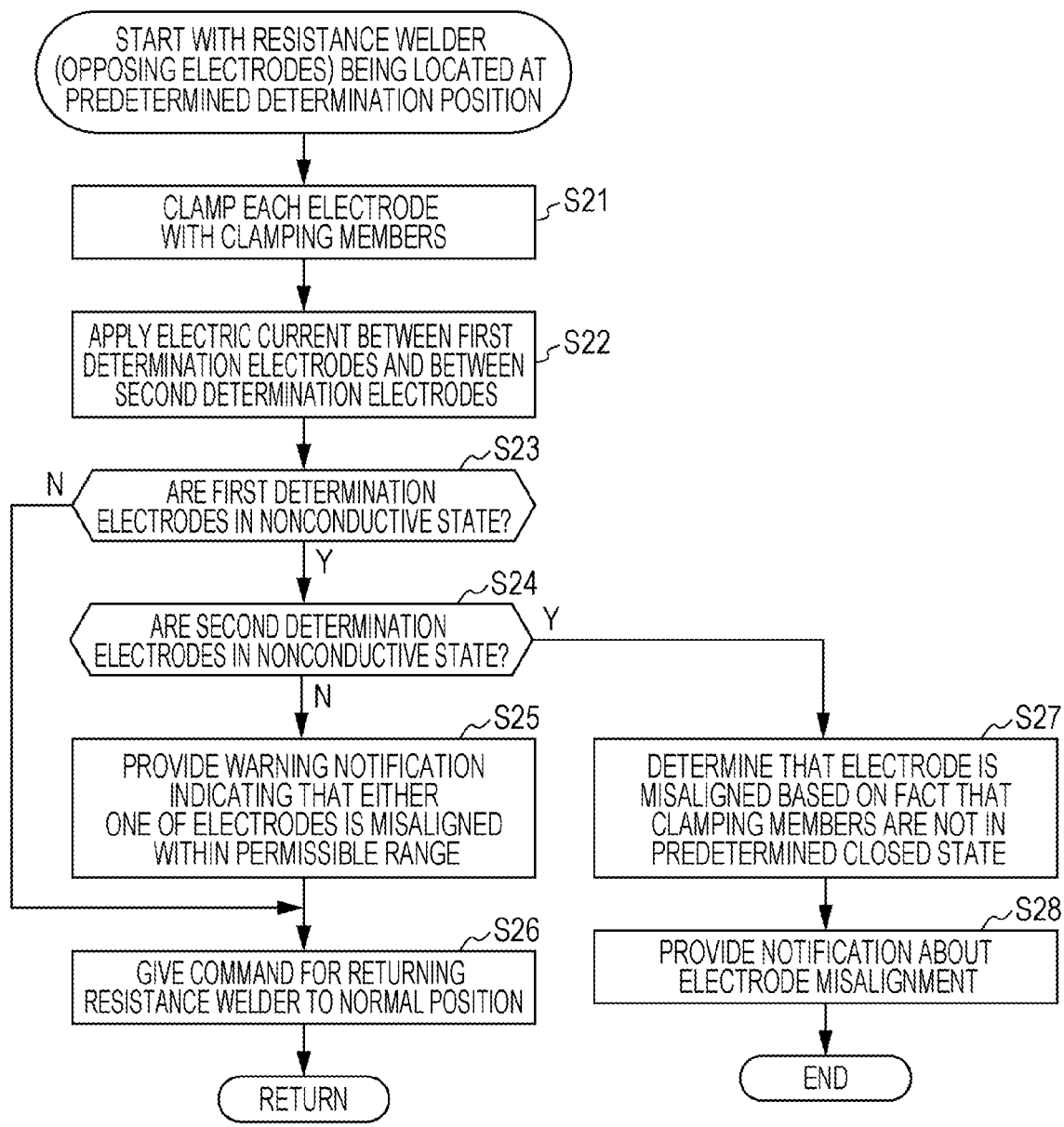
FIG. 11 is a flowchart of arithmetic processing to be executed by the controller of the electrode-misalignment detection device in FIG. 9A and FIG. 9B.

FIG. 11 is a flowchart illustrating arithmetic processing to be executed by the controller 3 for the operation and the determination of the electrode-misalignment detection device 2 according to this embodiment. This arithmetic processing starts in a state where the resistance welder (i.e., the opposing electrodes 1) is fixed to the aforementioned predetermined determination position. First, in step S21, each pair of clamping members 4 is moved toward the outer periphery of the corresponding electrode 1 to clamp the electrode 1.

The processing then proceeds to step S22 to apply electric current between the first determination electrodes 8 and between the second determination electrodes 21.

Subsequently, the processing proceeds to step S23 to determine whether the first determination electrodes 8 are in a nonconductive state. If the first determination electrodes 8 are in a nonconductive state, the processing proceeds to step S24. Otherwise, the processing proceeds to step S26.

In step S24, it is determined whether the second determination electrodes 21 are in a nonconductive state. If the second determination electrodes 21 are in a nonconductive state, the processing proceeds to step S27. Otherwise, the processing proceeds to step S25.

In step S25, a warning notification indicating that either of the electrodes 1 is misaligned within the permissible range is provided, and the processing proceeds to step S26. This warning notification is provided by using, for example, any one of a display, a signal light, and a buzzer.

In step S26, a command is given to cause the resistance welder to return to its normal position, and the processing subsequently returns to the normal resistance welding process.

On the other hand, in step S27, it is determined that the clamping members 4 of each pair are not in the predetermined closed state and that either of the electrodes 1 is misaligned (beyond the permissible range in this case), and the processing proceeds to step S28.

In step S28, a notifier (not illustrated) provides a notification about the electrode misalignment, and the processing ends. An example of the notifier is any one of a display, a signal light, and a buzzer. In other words, since the resistance welder in this case is not returned to its normal position, the relevant resistance welding process is stopped.

According to this arithmetic processing, if the first determination electrodes 8 are in a conductive state, the electrodes 1 are located at appropriate positions, so that the electrodes 1 are not misaligned, as in the first embodiment. Therefore, the resistance welder can be returned to its normal position, whereby, for example, vehicle-body mass production can be continuously performed. In contrast, if the first determination electrodes 8 and the second determination electrodes 21 are both in a nonconductive state, the clamping members 4 of each pair are not in the predetermined closed state, so that it can be determined that either of the electrodes 1 is misaligned. Then, when the electrode misalignment is determined, for example, a notification about the electrode misalignment is provided by, for example, any one of a display, a signal light, and a buzzer. When the notification about the electrode misalignment is provided, the relevant resistance welding process is stopped, so that, for example, the operator can correct the misalignment of the electrode 1 to regain the normal resistance welding process. Accordingly, the resistance welding quality can be ensured and improved. In one embodiment, the processes in step S23, step S24, and step S27 of the arithmetic processing executed by the controller 3 in FIG. 11 may serve as process performed by "a signal generator", a "determination-electrode current applier", a "nonconductive-state detector", a "non-closed-state detector, and a "misalignment determiner". In contrast, if the second determination electrodes 21 are in a conductive state even when the first determination electrodes 8 are in a nonconductive state, it is determined that each electrode 1 is not located at an appropriate position and is misaligned, but the amount of misalignment thereof is still within the permissible range. A warning notification about the electrode misalignment is provided by using, for example, any one of a display, a signal light, and a buzzer. In this case, the resistance welder is returned to its normal position, whereby vehicle-body mass production can be continuously performed. Then, when the warning notification about the electrode misalignment is provided, for example, the electrode position may be corrected when the next operation is stopped, thereby returning the electrode 1 to the appropriate position.

The electrode-misalignment detection device 2 in the resistance welder according to each embodiment has been described above. However, an embodiment of the disclosure is not to be limited to the configuration described in each of the above embodiments and permits various modifications within the scope of the embodiment of the disclosure. For example, although the opposing clamping members 4 are movable from the opposite radially outer sides of each electrode 1 to clamp the electrode 1 by rotating around the rotation shafts 11 in the first embodiment, the clamping members 4 may have an alternative electrode clamping configuration. For example, racks may be engaged with opposite sides, in the radial direction, of a pinion attached to a rotation shaft of a single electric motor, and clamping members may be attached to the individual racks, so that two clamping members can be moved toward and away from each electrode 1 from the opposite sides in the diameter direction thereof. With this configuration, each electrode 1 can be clamped from the diameter direction by the clamping members.

Furthermore, each electrode distance sensor that detects the distance to each electrode 1 in the radial direction thereof may be a noncontact distance sensor that uses any one of an ultrasonic wave, an infrared ray, and a laser beam.

The coil springs 22 that support the second determination electrodes 21 in a movable manner in the clamping-member opening-closing direction in the third embodiment may be replaced with leaf spring members that bend in the clamping-member opening-closing direction and that are attached to the distal ends of the clamping members 4, such that (the electrodes of) the second determination electrodes 21 are rigidly attached to these leaf spring members. In this case, the dimension by which (the electrodes of) the second determination electrodes 21 attached to the leaf spring members protrude relative to the first determination electrodes 8 is set similarly to that in the third embodiment, so that similar effects can be achieved.

Furthermore, the second determination electrodes 21 in the third embodiment may be replaced with a load sensor, such as a strain meter. In this case, for example, the clamping members 4 may individually be provided with leaf spring members that are to come into contact with each other at the same timing as the second determination electrodes 21, and the load sensor may be attached to at least one of the leaf spring members. Even when the (first) determination electrodes 8 are in a nonconductive state, if the load detected by the load sensor is higher than or equal to a threshold value, a warning notification indicating that either of the electrodes 1 is misaligned but the amount of misalignment thereof is within a permissible range is provided. When the warning notification about the electrode misalignment is provided, for example, the electrode position may be corrected when the next operation is stopped, thereby returning the electrode 1 to the appropriate position. If the amount of misalignment of the electrode 1 has exceeded the permissible range in a case where the determination electrodes 8 are in a nonconductive state and the detected load is lower than the threshold value, the operation may be stopped, so that effects similar to those in the third embodiment can be achieved. If a piezo element is to be used as the load sensor, for example, it is conceivable to attach the load sensor to, for example, the bearing surface of any of the coil springs 22 in the third embodiment.

Furthermore, the load sensor may be replaced with a noncontact distance sensor as used in the second embodiment. In this case, for example, one of the extension segments 4a of the clamping members 4 may be provided with the noncontact distance sensor, whereas the other may be provided with a distance-detection target member detectable by the noncontact distance sensor. For example, if the noncontact distance sensor is a proximity switch 5, a metallic member that the proximity switch 5 reacts to is attached to the extension segment 4a at the opposing position. Then, even when the (first) determination electrodes 8 are in a nonconductive state, if the distance detected by this distance sensor is smaller than a threshold value, a warning notification indicating that either of the electrodes 1 is misaligned but the amount of misalignment thereof is within a permissible range is provided. When the warning notification about the electrode misalignment is provided, for example, the electrode position may be corrected when the next operation is stopped, thereby returning the electrode 1 to the appropriate position. If the amount of misalignment of the electrode 1 has exceeded the permissible range in a case where the determination electrodes 8 are in a nonconductive state and the detected distance is larger than or equal to the threshold value, the operation may be stopped, so that effects similar to those in the third embodiment can be achieved.

As described above, according to each embodiment of the disclosure, misalignment of either of two opposing electrodes can be detected, so that the resistance welding quality can be ensured and improved particularly in vehicle-body mass production.

The invention claimed is:

1. An electrode-misalignment detection device in a resistance welder configured to join joint members together by holding the joint members between opposing electrodes and applying pressure and electricity to the joint members, the electrode-misalignment detection device comprising:
an electrode misalignment detector configured to simultaneously approach outer peripheries of both of the opposing electrodes in a state where the resistance welder is located at a predetermined position so as to detect misalignment of each of the outer peripheries,
wherein the electrode misalignment detector comprises
a clamping member movable toward the outer peripheries of the both of the opposing electrodes to clamp the opposing electrodes from opposite radially outer sides of the opposing electrodes, in a state where the resistance welder is located at the predetermined position, and settable in a predetermined closed state in a case where each of the opposing electrodes is located at an appropriate position,
a signal generator configured to output a movement state signal according to a movement state of the clamping member toward the outer peripheries of the opposing electrodes,
a non-closed-state detector configured to detect that the clamping member moved toward the outer peripheries of the opposing electrodes is in a state other than the predetermined closed state based on the movement state signal from the signal generator, and
a misalignment determiner configured to determine that either one of the electrodes is misaligned in a case where the non-closed-state detector detects that the clamping member is in the state other than the predetermined closed state.

2. The electrode-misalignment detection device in the resistance welder according to claim 1,
wherein the signal generator comprises
determination electrodes provided at the clamping member and configured to come into contact with each other in a case where the clamping member moved toward the outer peripheries of the electrodes is in the predetermined closed state, and
a determination-electrode current applier configured to apply electric current between the determination electrodes in a state where the clamping member is moved toward the outer peripheries of the electrodes,
wherein the non-closed-state detector comprises
a nonconductive-state detector configured to detect that the determination electrodes are in a nonconductive state in a state where the electric current is applied between the determination electrodes by the determination-electrode current applier, and
wherein the clamping member is determined as being in the state other than the predetermined closed state in a case where the nonconductive-state detector detects that the determination electrodes are in the nonconductive state.

3. An electrode-misalignment detection device in a resistance welder configured to join joint members together by holding the joint members between opposing electrodes and applying pressure and electricity to the joint members, the electrode-misalignment detection device comprising:
- an electrode misalignment detector configured to simultaneously approach either of an outer periphery and a distal end of each of the opposing electrodes in a state where the resistance welder is located at a predetermined position so as to detect misalignment of the either of the outer periphery and the distal end,
- wherein the electrode misalignment detector comprises
- an electrode distance sensor positioned at a radially outer side of the opposing electrodes in the state where the resistance welder is located at the predetermined position and configured to detect a distance to either of the outer periphery and the distal end of the each of the opposing electrodes in a radial direction of the each of the opposing electrodes in a noncontact fashion, and
- a misalignment determiner configured to determine that one of the opposing electrodes is misaligned in a case where the distance to the one of the opposing electrodes in the radial direction of the one of the opposing electrodes is smaller than or equal to a predetermined distance, the distance being detected by the electrode distance sensor.

4. The electrode-misalignment detection device in the resistance welder according to claim 3, further comprising:
- an electrode-position reflection member configured to be disposed between the distal end of the each of the opposing electrodes and the electrode distance sensor when the electrode distance sensor is to detect the distance to the distal end of the each of the opposing electrode in the radial direction of the each of the opposing electrodes and movable in the radial direction of the each of the opposing electrodes in accordance with a position of the distal end of the each of the opposing electrodes,
- wherein the electrode distance sensor is configured to detect the distance to the distal end of the each of the opposing electrodes in the radial direction of the each of the opposing electrodes by detecting a distance to the electrode-position reflection member in the radial direction of the each of the opposing electrodes.

* * * * *